United States Patent Office 3,723,380
Patented Mar. 27, 1973

3,723,380
AROMATIC AMIDE-HYDRAZIDE COPOLYMER
Frank Dobinson, Gulf Breeze, Fla., assignor to Monsanto Company, St. Louis, Mo.
No Drawing. Continuation-in-part of abandoned application Ser. No. 29,259, Apr. 16, 1970. This application Feb. 4, 1972, Ser. No. 223,699
Int. Cl. C08g 20/00, 51/44
U.S. Cl. 260—32.6 NT 30 Claims

ABSTRACT OF THE DISCLOSURE

Aromatic amide-hydrazide copolymers are provided. These copolymers are characterized as being fiber-forming and having recurring structural units of

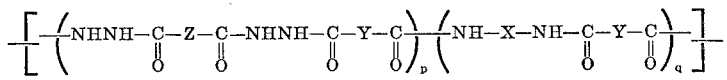

X and Y are divalent aromatic radicals; and Z is a divalent aromatic radical or a chemical bond. $p$ and $q$ are integers. The aromatic radicals have a molecular weight of less than 250 and are comprised of one or two meta- or para-phenylene linkages. The ratio of $p:q$ is in the range of from 1:3 through 9:1. Solutions of these polymers in amide solvents are suitable for use in spinning filaments, even though greater than 65% of the arylene moities are para-phenylene.

CROSS-REFERENCE TO RELATED APPLICATION

The present application is a continuation-in-part application of application Ser. No. 29,259, filed Apr. 16, 1970, now abandoned.

BACKGROUND OF THE INVENTION

Filaments and fibers from synthetic linear polyamides have found widespread commercial acceptance for many years. These commercial polyamides do not have modulus values desired for certain end uses. For example, where filaments of polyamides of the nylon-66 and nylon-6 types are used as reinforcing elements in pneumatic tires, the growth or "creep" in such filament gives rise to flat-spotting, a well-known problem of long standing. These common nylon polymers have alkylene radicals connecting the recurring amide units. As the art evolved it was noted that polyamides having arylene radicals connecting the amide units have vastly higher modulus values. Filaments from these aromatic polyamides have been found to be eminently suitable as tire yarn—both for use in the carcass of the tire or as a reinforcing belt—and as reinforcing materials in high strength composite structures. Aromatic polymers containing major proportions of para-phenylene ring structures in particular tend to have high moduli.

Unfortunately, these aromatic polymers have extraordinarily high melting points, so high that melt spinning of filaments from the polymers is not practical. Accordingly, resort has been made to dry or wet spinning techniques for producing filaments from aromatic polyamides. But the introduction of major quantities of the p-phenylene units into the polymer structure normally leads to insolubility of the polymer in the better and known solvents. Particularly suitable solvents are the lower dialkyl acid amide solvents but known polyamides with a high proportion of p-phenylene linkage are not soluble in this class of solvents to the extent necessary for use in commercial filament formation. A class of polymers with a high proportion of p-phenylene linkages now has been found that can be put into solutions from which high modulus strands can be spun economically.

SUMMARY OF THE INVENTION

Described herein is a new class of copolyamides containing hydrazide linkages and amide linkages suitable for spinning into fibers, filaments and the like having a modulus of at least 100 grams per denier. The polymers have the general formula

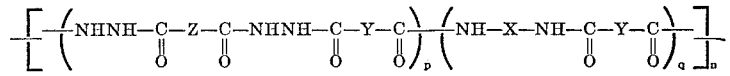

X and Y are divalent aromatic radicals. Z is a divalent aromatic radical or simply a chemical bond. $p$ and $q$ are positive integers relating the average number of recurring units. The aromatic radicals have a molecular weight of less than 250 and are comprised of one or two meta- or paraphenylene linkages. It is important that the $p:q$ ratio is in the range of 1:3–9:1, preferably in the range of 1:1–4:1. $n$ is a number indicative of the molecular weight which is sufficiently high that filaments, films and the like of high tensile properties can be made from the copolymer. At least 65% of the arylene moieties are paraphenylene.

A solution suitable for spinning into filaments, films and the like strands can be prepared by dissolving the copolymer in an amide solvent among which are N,N-dimethylacetamide and N,N-dimethylformamide.

Satisfactory methods for preparing these wholly aromatic polyamides are known. Although these polymers may be prepared using interfacial techniques, the use of solution polymerization is preferred because the resulting polymer solutions can be spun directly into filaments. When the solution preparation method is employed, representative members of this class of polymers may be prepared conveniently and preferably by the reaction of an aromatic diacid halide and an aromatic dihydrazide with an aromatic diamine at low temperatures in a suitable lower dialkyl N-substituted amide solvent, such as N,N-dimethylacetamide and N,N-dipropylacetamide. In addition to the lower dialkylamides, solvents suitable for preparing the polymers and spinning solutions of this invention include N-methyl-2-pyrrolidone, hexamethyl phosphoric triamide, trifluoroacetic acid and the like. Generally the solvents include the presence of about 5% alkali or alkaline earth halide, such as lithium chloride. Mixtures of solvents are also contemplated. Concentrated sulfuric acid and dimethyl sulfoxide may also be used for redissolving polymers which have been isolated and purified, as for example, when interfacial techniques are used to prepare the polymers. Preferably, the same solvent is used for both polymer preparation and spinning.

Among the dihydrazides suitable for preparing novel polymers disclosed herein are terephthalic dihydrazide, isophthalic dihydrazide, oxalic dihydrazide, 4,4'-diphenyldicarboxylic dihydrazide, 3,4-diphenyldicarboxylic dihydrazide, 4,4'-methylenedibenzoic dihydrazide, 3,4'-methylenedibenzoic dihydrazide, 4,4'-ethylenedibenzoic dihydrazide, and others. Included among the suitable aromatic diacid halides are terephthaloyl chloride, terephthaloyl bromide, isophthaloyl chloride, isophthaloyl bromide, 4,4'-diphenyl dicarbonyl chloride, 4,4' - methylenedibenzoyl chloride, and others. Included among the suitable aromatic diamines are p-phenylene diamine, m-phenylene diamine, benzidine, 4,4'-methylene dianiline, 3,4'-methylene dianiline, 4,4'-ethylene dianiline, 3,4'-methylene dianiline, 2,2-bis(p-aminophenyl)propane, and others.

When the polymer is prepared in part from an aromatic halide, the hydrogen halide formed during the polymerization should be neutralized or removed from the polymer solution prior to spinning in order to prevent its harmful effect on the resulting product and corrosive effect on the spinning equipment used. Neutralization may be conveniently accomplished by adding an alkali or alkaline earth metal base to the polymer solution. Specific examples of such bases include lithium carbonate, lithium hydroxide, calcium hydroxide, calcium carbonate, calcium acetate, and magnesium carbonate.

As a result of the neutralization reaction, the polymers are dissolved in the solvent, preferably a lower dialkyl amide, containing an amount of salt and water proportional to the amount of hydrogen halide formed during the polymerization. The salt contributes to the polymer solubilization and varies in amount with the chemical structure and molecular weight of the polymer, but generally ranges from about 1% to about 8% based on solution weight.

The polymer spinning solutions may also be prepared by dissolving a washed isolated polymer, such as one prepared by the interfacial technique, in a solvent containing from about 1% to about 8% of an alkali or alkaline earth metal chloride or bromide at a temperature of about 60–90° C. Suitable salts are lithium chloride, lithium bromide, calcium, chloride zinc chloride and the like. Of these, calcium chloride and lithium chloride are preferred. Although it is not essential, the addition of up to about 4% water to these spinning solutions may improve their stability.

Even though the present polymers contain an extraordinarily high amount of para-phenylene radicals, filaments can be conveniently spun therefrom by wet spinning processes. The amount of polymer in the spinning solution may be from about 5 percent to about 30 percent. Preferably the solution contains 6–18 percent polymer. For best results, as well as for increased productivity, it is generally desirable to use as concentrated polymer solution as possible and practical. Of course, the solubility of the polymer varies inter alia with the structure of the polymer and with regard to the solvent used. The polymers should have an inherent viscosity of from about 0.6 to 3.0 or higher as measured at 30° C. as a 0.5% solution of N,N-dimethylacetamide containing 5% lithium chloride.

The spinning solution is ordinarily heated to at least 40° C. prior to spinning. The solution is forced through a suitable number of holes in a spinnerette. The extrusion face of the spinnerette is preferably disposed just above the liquid level of a coagulating spin bath, although it may very well be submerged therein. Spin baths, suitable for converting the extruded polymer solutions into strand-like objects may be comprised of water or a mixture of water and a lower alkylamide solvent. After coagulation the filaments are washed, stretched, dried and stretched again by known procedures.

EXAMPLE I

The preparation of a polymer from terephthalic dihydrazide, benzidine dihydrochloride and terephthaloyl chloride and the formation of a strand therefrom are illustrated by this example.

2.43 grams (0.0125 mole) of terephthalic dihydrazide and 3.34 grams (0.0125 mole) of benzidine dihydrochloride were slurried in a reaction vessel with 50 mls. of dry N,N-dimethylacetamide solvent. In addition to the reactants, the solvent contained 5 weight percent lithium chloride. The water content of the slurry was maintained below 200 p.p.m. The reaction vessel was a pear-shaped flask equipped with an efficient stirrer. A slow bleed of dry nitrogen gas passed through the flask above the reaction mass. The resulting slurry was cooled to 0° C. in an ice bath; and 5.08 grams (0.025 mole) of terephthaloyl chloride was added to the vessel, together with 50 mls. of additional lithium chloride-containing N,N-dimethylacetamide. It was observed that viscosity built up rapidly. After thirty minutes the ice bath was removed. Two hours thereafter 3.15 grams (0.075 mole) of lithium hydroxide hydrate was added to neutralize the hydrochloric acid formed during the polymerization together with that from benzidine dihydrochloride.

A portion of the viscous solution of this example was poured onto a glass plate and spread into a film about 20 mils thick. The film was heated in an oven at 80° C. for three hours, peeled from the glass and soaked in water for eighteen hours. A clear, tough film was produced. Differential thermal analysis of this copolymer showed no major endotherm ascribable to melting up to 400° C.

EXAMPLE II

A polymer from isophthalic dihydrazide, benzidine dihydrochloride, and terephthaloyl chloride was prepared. A highly viscous dope of the polymer was formed into a tough film. The polymer, dope and film formation was accomplished by following the procedure of Example I except that an equal amount of isophthalic dihydrazide was substituted for terephthalic dihydrazide.

EXAMPLE III

A polymer from terephthalic dihydrazide, benzidine dihydrochloride and isophthaloyl chloride was prepared. A highly viscous dope of the polymer was formed into a tough film. The polymer, dope and film formation was accomplished by following the procedure of Example I except that an equal amount of isophthaloyl chloride was substituted for terephthaloyl chloride.

EXAMPLE IV

The preparation of a polymer from terephthalic dihydrazide, 4,4'-methylene dianiline and terephthaloyl chloride and the formation of a strand therefrom are illustrated by this example.

2.43 grams (0.0125 mole) of terephthalic dihydrazide and 2.48 grams (0.0125 mole) of 4,4'-methylene dianiline were slurried in a reaction vessel with 50 mls. of dry N,N-dimethylacetamide. In addition to the amide, the solvent contained 5 weight percent lithium chloride. A blanket of nitrogen gas was maintained over the reactants in the vessel. The reactants were stirred and cooled to 0° C. 5.08 grams (0.025 mole) of terephthaloyl chloride was added to the vessel, together with 50 mls. of additional lithium chloride-containing N,N-dimethylacetamide. It was observed that viscosity built up rapidly. After thirty minutes the ice bath was removed. Two hours thereafter 2.1 grams (0.05 mole) of lithium hydroxide hydrate was added to neutralize the hydrochloric acid formed during the polymerization.

A portion of the neutralized solution was poured onto a glass plate and spread into a film about 20 mils thick. The film was heated in an oven at 80° C. for three hours, peeled from the glass and soaked in water for 18 hours. A clear, tough film was produced. The polymer had an inherent viscosity of 2.88. Differential thermal analysis of this copolymer showed no major endotherms ascribable to melting up to 400° C.

In a second run the same polymer was prepared. In this second preparation, however, calcium acetate was used instead of lithium hydroxide hydrate as the neutralizer. The polymer inherent viscosity in this case was 2.36.

EXAMPLE V

The preparation of a polymer from meta-phenylene diamine, oxalic dihydrazide and terephthaloyl chloride and the formation of a strand therefrom are illustrated by this example.

1.08 grams (0.01 mole) of meta-phenylene diamine and 1.18 grams (0.01 mole) of oxalic dihydrazide were slurried in a reaction vessel with 25 mls. of dry N,N-dimethyl acetamide solvent containing 5 weight percent lithium chloride. The resulting slurry was cooled to 0° C. and 4.06 grams (0.02 mole) of terephthaloyl chloride was added to the vessel along with 25 mls. of additional solvent. It was observed that viscosity built up rapidly. After thirty minutes the ice bath was removed. Two hours thereafter sufficient calcium acetate was added to neutralize the formed hydrochloric acid. Clear, tough films were cast from this solution.

EXAMPLE VI

The polymer formation as described in Example V was repeated, using the same reactants but in different molar ratios. In this case 0.014 mole of meta-phenylene diamine, 0.006 mole of oxalic dihydrazide and 0.02 mole of terephthaloyl chloride were reacted as before in 50 ml. of the lithium chloride-containing N,N-dimethyl acetamide solvent. From the clear, viscous polymer solution, tough films were formed.

EXAMPLE VII

The preparation of a polymer from terephthalic dihydrazide, 4,4'-ethylene dianiline and terephthaloyl chloride and the formation of a strand therefrom are illustrated by this example.

1.94 gram (0.01 mole) of terephthalic dihydrazide and 2.12 grams (0.01 mole) of 4,4'-ethylene dianiline were slurried in a reaction vesel with 50 mls. of dry N,N-dimethylacetamide containing 5 weight percent lithium chloride. A blanket of nitrogen gas was maintained over the reactants in the vessel. The reactants were stirred and cooled to 0° C. 4.06 grams (0.02 mole) of terephthaloyl chloride was added to the vessel, together with additional 50 mls. of the solvent. A viscous solution rapidly formed. After thirty minutes the ice bath was removed. Two hours later sufficient lithium hydroxide was added to the reactants to neutralize the hydrochloride acid formed. A viscous, yellow solution resulted from which films were cast. The polymer had an inherent viscosity of 1.01.

EXAMPLE VIII 2.72 grams (0.014 mole) of terephthalic dihydrazide and 1.19 grams (0.006 mole) of 4,4'-methylene dianiline were slurried in a reaction vessel with 50 mls. of dry N,N-dimethylacetamide containing 5 weight percent lithium chloride. The contents of the vessel were cooled to 0° C. and 4.06 grams (0.02 mole) of terephthaloyl chloride was added thereto, using 10 mls. additional solvent to complete the addition of the third reactant. The reaction product was a clear, viscous solution of copolymer containing 85 mole percent of para-phenylene linkages derived from the terephthaloyl moiety.

EXAMPLE IX 1.18 gram (0.01 mole) oxalic dihydrazide and 1.98 gram (0.01 mole) 4,4'-methylene dianiline were slurried in a reaction vessel with 50 mls. of dry N,N-dimethylacetamide containing 5 weight percent lithium chloride. The contents of the vessel were cooled to 0° C. and 4.06 grams (0.02 mole) of terephthaloyl chloride was added thereto using 25 mls. of the solvent to complete the addition. After 15 minutes, the ice-bath was removed. About three hours later, the clear, highly viscous solution was neutralized with 1.68 gram (0.04 mole) of lithium hydroxide monohydrate. The resulting polymer had an inherent viscosity of 1.67. The solution was cast as a 50-mil film which when dried several hours at 125° C. produced a clear, tough film.

EXAMPLE X

A polymer was prepared from terephthalic dihydrazide, 4,4'-methylene dianiline and terephthaloyl chloride in the molar ratio of 0.65:0. 35:1.0 thereof so that the final polymer contained 82.5% mole percent para-phenylene linkages derived from terephthalic dihydrazide and terephthaloyl chloride. Fibers were spun from the polymer in accordance with a wet spinning process.

25.25 grams (0.13 mole) of terephthalic dihydrazide and 13.88 (0.07 mole) of 4,4'-methylene dianiline were mixed with 500 mls. of dry N,N-dimethylacetamide in a reaction vessel equipped with a stirrer. The amide solvent contained 5% lithium chloride. The mixture was slurried and cooled to 0° C. by means of an ice bath. 40.6 grams of terephthaloyl chloride was added to the vessel and the mixture was rapidly stirred. The ice bath was removed after one hour. Polymerization was continued for a further 2.5 hours. To terminate the polymerization and neutralize the acid of polymerization, lithium hydroxide hydrate (16.8 grams, 0.4 mole) was added as a ball-milled slurry in 40 mls. of the lithium chloride-containing acetamide solvent. Further stirring, produced a clear, bright viscous dope containing about 12% by weight of polymer. The polymer had an inherent viscosity of 2.28.

The polymer solution, warmed to 60° C., was placed in a filament spinning device. The polymer was forced through a spinnerette having 5 round holes, each 6 mils in diameter. The temperature of the device was 60° C. The extruded streams of polymer were spun through a half-inch air gap into an aqueous coagulating spin bath. Clear, well-collapsed filaments were forwarded around a pair of rollers immersed in a wash-bath composed of 75% water and 25% N,N-dimethylacetamide at such a rate that the filaments were stretched about 1.5 times in the air-gap. The stretch at this point is called a jet stretch. The washed filaments were then forwarded through a bath two feet in length to a second pair of rollers. The temperature of the bath was 90° C. and the bath was composed of 90%, water and 10% N,N-dimethylacetamide. Between the two sets of rollers the filaments were stretched 1.4 time. The filaments were further washed on this second set of rollers with water at 50° C. The filaments were then dried and hot-stretched 2.4 times over a hot shoe maintained at 400° C. In measuring the physical properties, it was found that the filaments had a tenacity of 7.9 grams/denier, an elongation at break of 4.3%, and a modulus at 1% extension (commonly called initial modulus) of 284 grams/denier.

Another sample of the same polymer of this example was spun in an identical manner except that a hot shoe stretch of 2.3 x was employed. The filaments had a tenacity of 8.1 grams/denier, an elongation at break of 4.3% and an initial modulus of 237 grams/denier.

EXAMPLE XI

A copolyamide was prepared from terephthalic dihydrazide, 4,4'-methylene dianiline and terephthaloyl chloride in the molar ratio of 0.50:0.50:1.0 thereof so that the resulting polymer contained 75 mole percent para-phenylene linkages derived from terephthalic dihydrazide and terephthaloyl chloride.

19.4 grams (0.10 mole) of terephthalic dihydrazide and 19.8 grams (0.10 mole) of 4,4'-methylene dianiline were mixed with 335 mls. of dry N,N-dimethylacetamide in a reaction vessel equipped with a stirrer. The amide solvent contained 5% lithium chloride. The mixture was slurried and cooled to 0° C. by use of an ice bath. 40.6 grams (0.20 mole) of terephthaloyl chloride was added to the vessel and the mixture was rapidly stirred. The ice bath was removed after one hour. Polymerization was continued a further 2.5 hours. To terminate the polymerization and neutralize the acid of polymerization lithium hydroxide hydrate (16.8 grams, 0.4 mole) was added as a slurry in 33 mls. of the lithium chloride-containing dimethyl acetamide solvent. Further stirring produced a clear, bright viscous dope containing approximately 15% by weight of polymer. The inherent viscosity of the polymer was 1.88.

Filaments were made as in the just preceding example. However, a 10-hole 6-mil spinnerette was employed. A jet stretch of 3.0 times, a hot-water bath stretch of 1.3 times, and a hot shoe stretch of 1.7 times were employed. The filaments so-produced had a tenacity of 3.3 grams per denier, an elongation at break of 5.0% and an initial modulus of 118 grams/denier.

EXAMPLE XII

A copoly(amide-hydrazide) was prepared from terephthalic dihydrazide, 4,4'-methylene dianiline and terephthaloyl chloride in the molar ratio of 0.8:0.2:1.0 thereof so that the resulting polymer contained 90 mole percent para-phenylene linkages derived from terephthalic dihydrazide and terephthaloyl chloride. The polymerization procedure of Example X was followed. A clear, viscous dope containing about 8 weight percent polymer was produced. The polymer had an inherent viscosity of 2.7.

The polymer solution was spun into filaments following the spinning procedure of Example X. A jet stretch of 1.4 x, a hot-water bath stretch of 1.4 and a hot shoe stretch of 1.34 x were employed. The filaments so produced had a tenacity of 5.0 grams per denier, an elongation at break of 2.6% and an initial modulus of 269 grams/denier.

EXAMPLE XIII

Employing the polymerization procedure of Example X, 11.6 grams (0.06 mole) of terephthalic dihydrazide, 1.32 grams (0.0067 mole) of 4,4'-methylene dianiline and 13.5 grams (0.066 mole of terephthaloyl chloride were polymerized to give a viscous solution of a polymer containing 95 mole percent of para-phenylene units derived from terephthalic dihydrazide and terephthaloyl chloride. The inherent viscosity of the polymer was 4.98.

What is claimed is:

1. An aromatic amide-hydrazide copolymer suitable for preparing high modulus fibers and films having recurring structural units of

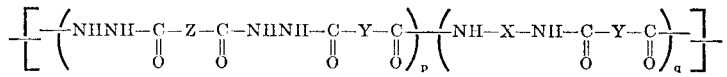

wherein X and Y are divalent aromatic radicals having a molecular weight of less than 250 and being comprised of one or two meta- or para-phenylene linkages; Z is a chemical bond or a divalent aromatic radical of the type just-defined; $p$ and $q$ are positive integers; the ratio of $p:q$ is in the range of from 1:3 through 9:1, and at least 65% of the phenylene linkages are para-phenylene.

2. The copolymer of claim 1 wherein the aromatic radicals are selected from the group consisting essentially of the meta- and para-isomers of the following:

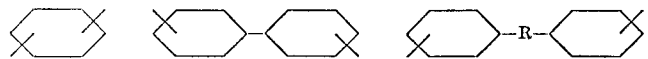

wherein R is an alkylene radical of 5 or less carbon atoms.

3. The copolymer of claim 2 wherein the $p:q$ ratio is in the range from 1:1 through 4:1.

4. A fiber having an initial modulus of at least 100 grams per denier and made of an aromatic amide-hydrazide copolymer having recurring units of

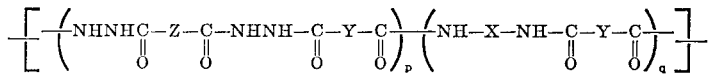

wherein X and Y are divalent aromatic radicals having a molecular weight less than 250 and being comprised of one or two meta- or para-phenylene linkages; Z is a chemical bond or a divalent aromatic radical of the type just defined; $p$ and $q$ are positive integers; the ratio of $p:q$ is in the range of from 1:3 through 9:1; and at least 65% of the phenylene linkages are para-phenylene.

5. The fiber of claim 4 wherein the aromatic radicals are selected from the group consisting essentially of the meta- and para-isomers of the following:

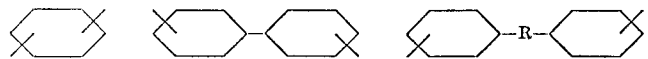

wherein R is an alkylene radical of 5 or less carbon atoms.

6. The fiber of claim 5 wherein the $p:q$ ratio of the copolymer is in the range from 1:1 through 4:1.

7. As a composition of matter a filament spinning solution comprising an aromatic amide-hydrazide copolymer suitable for preparing high modulus fibers and films having recurring structural units of

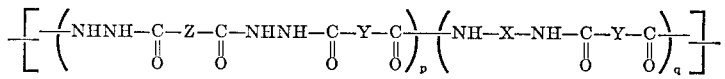

wherein X and Y are divalent aromatic radicals, having a molecular weight of less than 250 and being comprised of one or two meta- or para-phenylene linkages; Z is a chemical bond or a divalent aromatic radical of the type just-defined; $p$ and $q$ are positive integers; the ratio of $p:q$ is in the range of from 1:3 through 9:1; and at least 65% of the phenylene linkages are para-phenylene—said copolymer dissolved in an amide solvent.

8. The composition of claim 7 wherein the aromatic radicals of the copolymer are selected from the group consisting essentially of the meta- and para-isomers of the following:

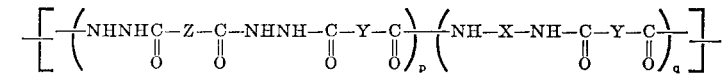

wherein R is an alkylene radical of 5 or less carbon atoms.

9. The composition of claim 8 wherein the $p:q$ ratio of the copolymer is in the range from 1:1 through 4:1.

10. A fiber-forming aromatic amide-hydrazide copolymer having recurring structural units of

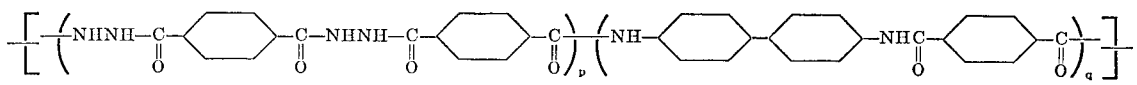

wherein $p$ and $q$ are positive integers, the ratio of $p:q$ being in the range of from 1:3 through 9:1.

11. A filament spinning solution comprising the copolymer of claim 10 dissolved in N,N-dimethylacetamide containing dissolved alkali or alkaline earth halide.

12. A fiber having an initial modulus greater than 100 grams per denier shaped from the copolymer of claim 10.

13. A fiber-forming aromatic amide-hydrazide copolymer having recurring structural units of

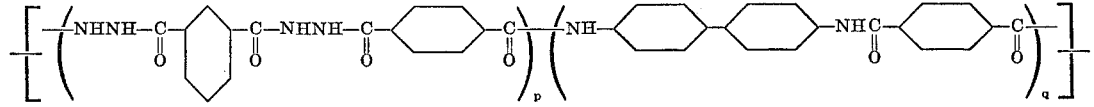

wherein p and q are positive integers, the ratio of p:q being in the range from 1:3 through 9:1.

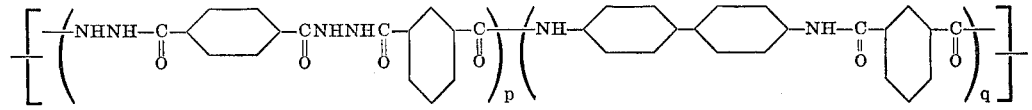

14. A filament spinning solution comprising the copolymer of claim 13 dissolved in N,N-dimethylacetamide containing dissolved alkali or alkaline earth halide.

15. A fiber having an initial modulus greater than 100 grams per denier shaped from the copolymer of claim 13.

16. A fiber-forming aromatic amide-hydrazide copolymer having recurring structural units of

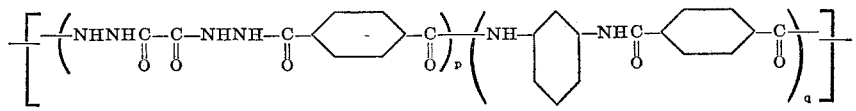

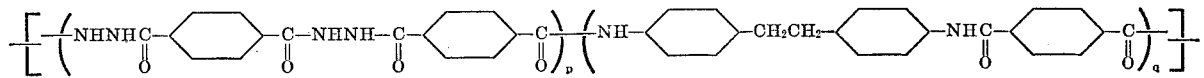

17. A filament-spinning solution comprising the copolymer of claim 16 dissolved in N,N-dimethylacetamide containing dissolved alkali or alkaline earth halide, being in the range from 1:3 through 9:1.

18. A fiber having an initial modulus greater than 100 grams per denier shaped from the copolymer of claim 16.

19. A fiber-forming aromatic amide-hydrazide copolymer having recurring structural units of

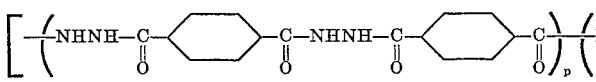

wherein p and q are positive integers, the ratio of p:q being in the range from 1:3 through 9:1.

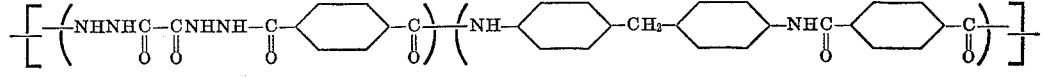

20. A filament spinning solution comprising the copolymer of claim 19 dissolved in N,N-dimethylacetamide containing dissolved alkali or alkaline earth halide.

21. A fiber having an initial modulus greater than 100 grams per denier shaped from the copolymer of claim 19.

22. A fiber-forming aromatic amide-hydrazide copolymer having recurring structural units of

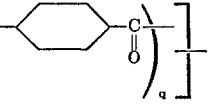

wherein p and q are positive integers, the ratio of p:q being in the range from 1:3 through 9:1.

23. A filament-spinning solution comprising the copolymer of claim 22 dissolved in N,N-dimethylacetamide containing dissolved alkali or alkaline earth halide.

24. A fiber having an initial modulus greater than 100 grams per denier shaped from the copolymer of claim 22.

25. A fiber-forming aromatic amide-hydrazide copolymer having recurring structural units of

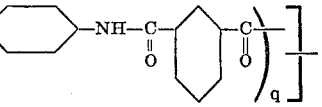

wherein p and q are positive integers, the ratio of p:q being in the range from 1:3 through 9:1.

26. A filament-spinning solution comprising the copolymer of claim 25 dissolved in N,N-dimethylacetamide containing dissolved alkali or alkaline earth halide.

27. A fiber having an initial modulus greater than 100 grams per denier shaped from the copolymer of claim 25.

28. A fiber-forming aromatic amide-hydrazide copolymer having recurring structural units of

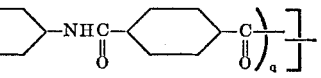

wherein p and q are positive integers, the ratio of p:q being in the range from 1:3 through 9:1.

29. A filament-spinning solution comprising the copolymer of claim 28 dissolved in N,N-dimethylacetamide containing dissolved alkali or alkaline earth halide.

30. A fiber having an initial modulus greater than 100 grams per denier shaped from the copolymer of claim 28.

References Cited

UNITED STATES PATENTS

| | | | |
|---|---|---|---|
| 3,632,548 | 1/1972 | Preston | 260—78 X |
| 3,536,651 | 10/1971 | Fruzer | 260—30.8 |
| 3,130,182 | 4/1964 | Fruzer | 260—78 |

MORRIS LIEBMAN, Primary Examiner

R. ZAITLEN, Assistant Examiner

U.S. Cl. X.R.

260—78 R, 78 TF, 32.6 NA